Dec. 15, 1925.  
P. SARTORY  
1,565,509  
MEANS FOR AND PROCESS OF CURLING AND WAVING HAIR  
Filed Aug. 4, 1924   3 Sheets-Sheet 1
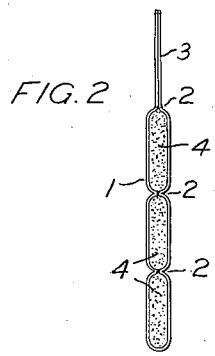
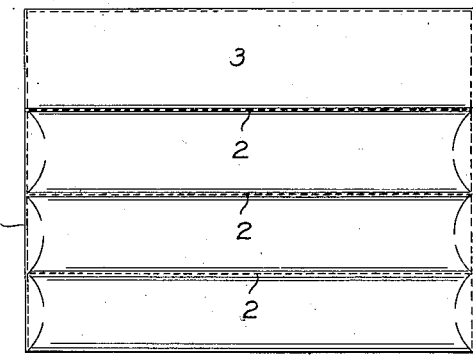
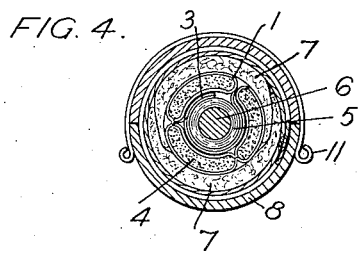
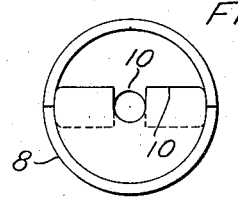
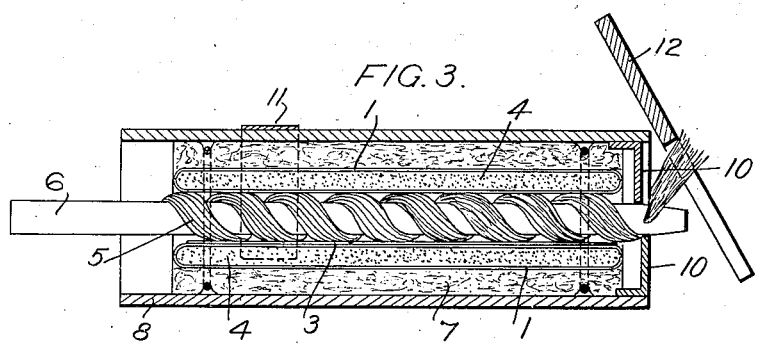
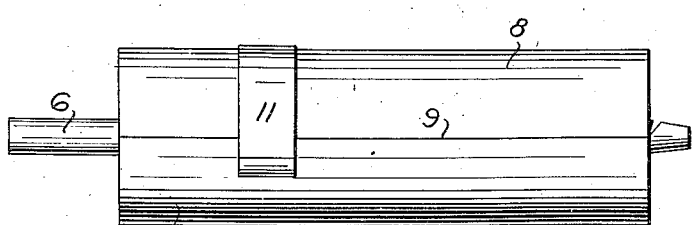
Inventor.  
Peter Sartory Dec. 15, 1925.                               1,565,509
P. SARTORY
MEANS FOR AND PROCESS OF CURLING AND WAVING HAIR
Filed Aug. 4, 1924                3 Sheets-Sheet 2
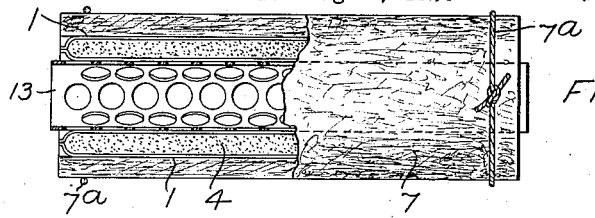
FIG. 7.
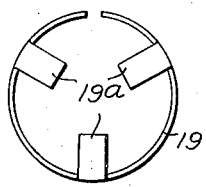
FIG. 9
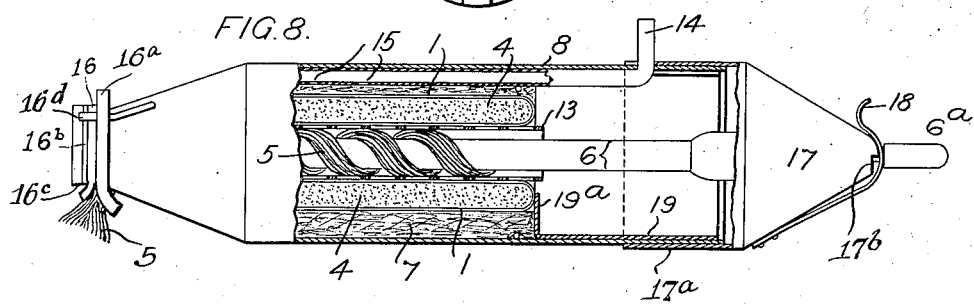
FIG. 8.
FIG. 10.
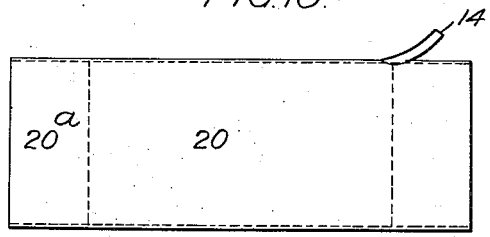
FIG. 19.
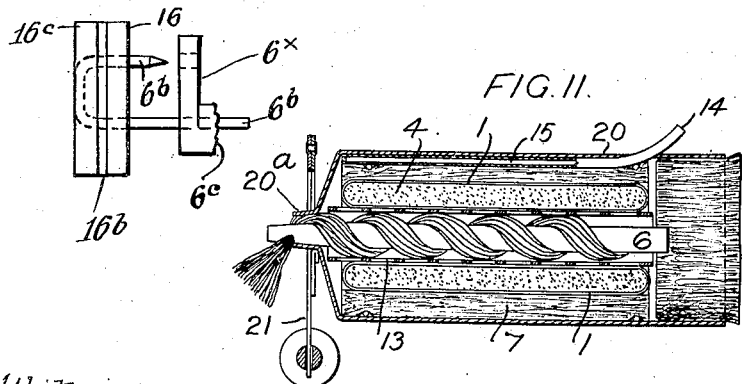
FIG. 11.    FIG. 12.
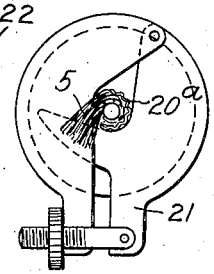
Witness.                Inventor.
                        Peter Sartory Dec. 15, 1925. 1,565,509
P. SARTORY
MEANS FOR AND PROCESS OF CURLING AND WAVING HAIR
Filed Aug. 4, 1924 3 Sheets-Sheet 3
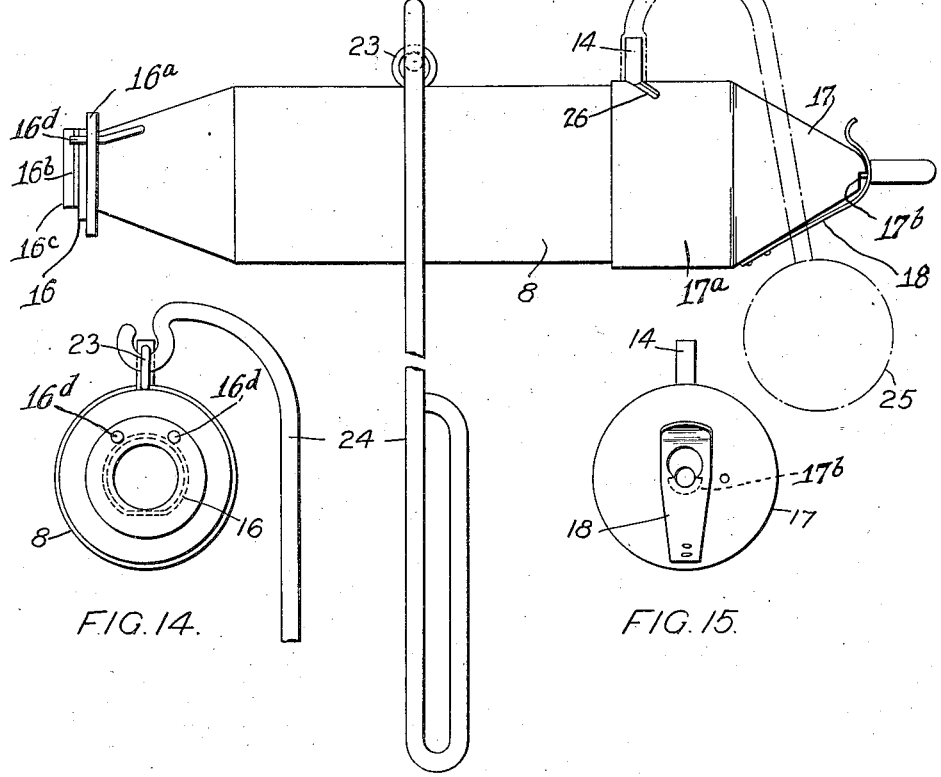
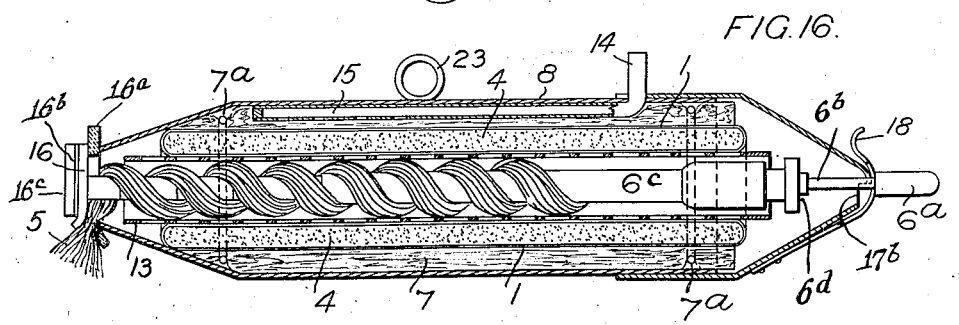
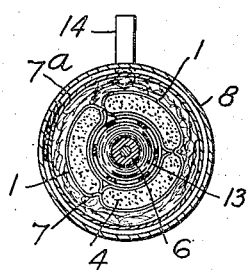
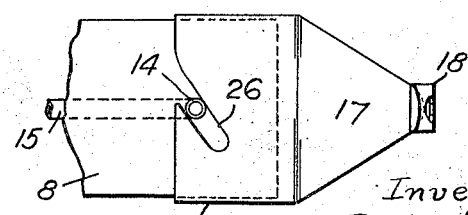
Inventor.
Peter Sartory,
by R W Bowden Attorney.

Patented Dec. 15, 1925.

1,565,509

UNITED STATES PATENT OFFICE.

PETER SARTORY, OF BAYSWATER, LONDON, ENGLAND.

MEANS FOR AND PROCESS OF CURLING AND WAVING HAIR.

Application filed August 4, 1924. Serial No. 730,122.

*To all whom it may concern:*

Be it known that I, PETER SARTORY, a subject of the King of Great Britain and Ireland, residing at Bayswater, London, England, have invented certain new and useful Improvements in and Relating to Means for and Processes of Curling and Waving Hair, of which the following is a specification.

This invention relates to processes of curling and waving human hair on the head, and has for its object to provide means for obtaining and applying chemical heat to the hair under treatment; thus dispensing with the use of the various electrical and other heating devices hitherto employed.

According to this invention the heat developed by the reaction of calcium oxide, strontia, baryta or other suitable material or materials with water or other liquid reagent, is utilized to effect the required heating and steaming of the hair under treatment in processes of curling and waving the hair.

The calcium oxide, strontia, or other material or mixtures of materials is or are conveniently wrapped in porous material and put up in the form of pads, tubular jackets, cartridges or the like, so that the same can be readily applied to a tress of hair arranged upon any preferred type of curler or the like in order to effect the steaming and heating of the same. For example, powdered or granular calcium oxide or the like may be put up in porous envelopes forming flat pads, similar in shape to the known borax pads, which heating pads can be wrapped round the hair to form a tubular member and be enclosed in a suitable steaming tube, which is sealed or secured about the ligament end of the hair tress under treatment; water or other suitable liquid reagent being applied either by means of a saturated pad enclosed in the tube, or the water or like reagent may be introduced through an opening in the tube enclosing the heating pad.

Alternatively, the calcium oxide may be put up in the form of tubes or tubular jackets, which can be slipped over a tress of hair arranged as usual upon a curler or the like.

Such tubular heating and steaming pads may be formed with an impervious outer cover, and when slipped over a coiled hair tress may be clipped, tied or otherwise secured steam-tight to the ligament end thereof, while water may be introduced at its opposite end, which is then closed or plugged in any convenient manner.

If preferred, however, the tubular heating and steaming pad may be enclosed in a suitable steaming tube of any preferred pattern, which is preferably secured steam-tight to the ligament end of the hair to be treated; the water or other reagent being introduced into the tube either by means of a saturated pad or bulb, syringe or the like through an inlet conveniently arranged in the steaming tube for this purpose, or in any other convenient manner to cause the heating reaction of the calcium oxide or other material comprised in the heating and steaming pad.

My invention is further illustrated with reference to the accompanying drawings, wherein similar reference numerals indicate like parts.

Figs. 1 and 2 are plan and cross sectional views of one form of chemical heating pad in accordance with the present invention.

Figs. 3 to 6 inclusive illustrate a means of applying such heating pad in order to effect the steaming of a coiled tress of hair; Figs. 3 and 4 being respectively longitudinal and cross sectional views showing the pad applied to a coiled tress of hair, and enclosed in a steaming tube together with an absorbent pad for applying moisture to the heating pad, while Figs. 5 and 6 are respectively external end and side views of the steaming tube.

Fig. 7 is a side view partly in section of one form of tubular chemical heating pad in accordance with the present invention.

Fig. 8 is a side view partly in section illustrating one manner of applying such tubular heating pad in a steaming tube provided with an inlet for water or the like reagent.

Fig. 9 is an end view of a split sleeve for positioning the tubular heating jacket in the steaming tube, as shown at Fig. 8.

Fig. 10 is an external side view of another form of tubular chemical heating pad, and Fig. 11 is a longitudinal sectional view further illustrating the same applicable to a coiled tress of hair.

Fig. 12 is an end view of the clamp indicated at Fig. 11 for securing the tubular heating and steaming pad to the ligament end of a coiled hair tress.

Figs. 13, 14 and 15 are respectively external side and opposite end views of a convenient steaming tube adapted for use in combination with a chemical heating pad for self use in curling and waving hair, while Figs. 16 and 17 are respectively longitudinal and cross sectional views illustrating the application thereof in combination with a chemical heating pad or jacket.

Fig. 18 is a detail view further illustrating the adjustable cap of the steaming tube shown at Figs. 13 and 16.

Fig. 19 is a plan view illustrating the construction of a closure for the steaming tube.

Referring to Figs. 1 and 2: 1 indicates a heating pad or jacket comprising a porous envelope of cheese cloth, paper, or the like divided into pockets by rows 2 of stitching and provided with a flap or extension 3; the pockets being filled with powdered or granular calcium oxide indicated at 4.

In Fig. 3, the pad illustrated at Figs. 1 and 2 is shown applied to a tress of hair 5 arranged upon a curler 6 the chemical material being supported by the porous fabric of which the envelope is made; the flap 3 being first wrapped round the curled tress to protect it from contact with the material 4 also forming a lining to the pad. As shown, water is applied to the heating pad by enveloping the same in cotton wool or like fibrous material 7 such as can be saturated with water, and which may be in the form of pads; the whole being enclosed in a steaming tube 8 of compressed fibre or other material.

The steaming tube 8 is divided longitudinally, as indicated at 9 (Fig. 6), each section having a slotted end plate 10 adapted to embrace the root end of the tress, the sections of the steaming tube being detachably held together by a clip 11 preferably secured to one section.

When the tube is assembled it compresses the saturated pads 7, so expressing the water into the heating material 4 of the pad or jacket 1 wherein an exothermic reaction is initiated, which develops sufficient heat for steaming the enclosed tress without risk of injury to the hair.

If desired a split rubber disc 12 of known form may be secured over the ligament or projecting end of the tress to prevent steam injuring the scalp, while the other end of the tube 8 may be left open as shown.

Referring now to Fig. 7, the heating pad 1 is arranged as a tubular member, and is carried on a skeleton member in the form of a light perforated tube 13, which may be of metal and which with the fabric material of the envelope 1 acts as a support for the chemical material; the pad 1 being enveloped in an absorbent layer 7 secured by ties $7^a$. The tubular heating pad, mounted and arranged as shown in Fig. 7, may be slipped into a steaming tube 8 provided with distributing means in the form of a perforated pipe 15, disposed lengthwise internally of the steaming tube, and having an open end 14 at the exterior of the tube, which open end serves as the water inlet. By such an arrangement an extensive initial distribution of the liquid reagent to the heating pad is assured.

The ligament end of the steaming tube is constructed with a seating $16^a$ with which cooperates a closure to form a steam tight joint when forced together, the closure being mounted at the root end of the curler, which closure comprises a rigid disc $16^b$ carried by the curler together with a covering disc $16^c$ of fibre, rubber or other non-conducting material and a soft rubber disc 16 which abuts the seating $16^a$ on the end of the steaming tube. In the construction shown at Figs. 8, 13 and 16 the curler comprises a rod $6^b$ (see Fig. 16) which passes through a tubular mandrel $6^c$ on which the tress is coiled, and carries the closure for the root end of the steaming tube 8, the closure being pierced by one end of the rod $6^b$, which end is returned through the closure as shown in Fig. 19 to position the closure on the rod, the other end of the rod being provided with a nut member $6^d$ (Fig. 16) which when suitably rotated causes relative movement between the mandrel $6^c$ and the rod $6^b$, thus forcing the root end closure on such rod against the boss or cross piece $6^x$ (Fig. 19) on the root end of the mandrel $6^c$ and so firmly clamping the ligament end of a hair tress 5 between the boss or cross piece $6^x$ on the mandrel and the root end closure on the rod. The root end of the steaming tube is provided with guide pins $16^d$ (see Figs. 8, 13 and 14) which pierce the seating $16^a$ and act as guides for the root end closure. This curler construction and closure is not claimed herein as novel, the construction and operation being set out in my U. S. Patent No. 1,524,721. The other end of the steaming tube is provided with an adjustable and removable cap 17 carrying a spring detent 18 which engages behind a shoulder $6^a$ on the tip end of the curler 6, so as to hold the closure steam tight against the seating $16^a$ on the tube 8. When a short heating pad or jacket is used, the same may be retained in position by means of a split sleeve 19 provided with lugs $19^a$, which bear against the end of the pad, the sleeve being split to pass along the pipe 15. The cap 17 is centrally perforated at 17ᵇ, so as to pass over the shoulder on the curler 6; the detent when engaging such shoulder constricts the opening and prevents the curler moving back out of the steaming tube.

Figs. 10 and 11 show a tubular heating jacket enveloped in an impervious outer cover 20 of water-proof paper or the like provided with a water inlet 14 and distributing pipe 15, which jacket is applied to a tress of hair 5 without requiring a separate steaming tube. The end 20ᵃ of the cover 20 is contracted steam tight to the ligament end of the curler 6 by means of an adjustable clip 21, and the other end thereof may be plugged as shown at 22.

Referring to Figs. 13 to 18: the tube 8 is provided with a ring 23 adapted to engage a handle 24 to facilitate supporting the tube when the same is manipulated personally, while the inlet tube 14 is conveniently connected to an india rubber or like bulb 25 for forcing water through the distributing pipe 15 in the tube 8.

As shown in Figs. 13 and 18, the cap 17 is provided with a flange 17ᵃ, which is slotted obliquely, as indicated at 26, to engage the open end 14 of the pipe 15 which passing out laterally of the steaming tube acts as a locking lug for adjusting the cap on the end of the tube 8, by reason of the flange extending beyond the lug so formed and the slot engaging the said locking lug.

If then a curler and a tubular exothermic heater are placed in the steaming tube, as shown, it suffices to turn the cap to force it axially of the tube together with the curler by reason of the detent engaging the shoulder, in such manner that the closure on the curler is forced and retained steam tight against the root end of the steaming tube.

I claim:—

1. The combination with a steaming tube of an exothermically operating tubular member disposed within the steaming tube including an inner annular layer of chemical material, and an outer layer of fibrous material, said chemical material being such as to react exothermically with a liquid, and said fibrous layer being capable of distributing a liquid reagent which can produce such reaction in said layer.

2. The combination with a steaming tube of an exothermically operating tubular layer of chemical material disposed within the steaming tube, said layer comprising an inner annular layer of chemical material and an outer layer of fibrous material, the chemical material being such as to react exothermically with a liquid, and a perforated pipe disposed lengthwise internally of said steaming tube and having an open end at the exterior thereof whereby an extensive initial distribution of the liquid reagent required to produce said exothermic reaction is assured to said fibrous layer.

3. The combination with a steaming tube of a perforated pipe disposed lengthwise internally of said tube and having an open end at the exterior thereof, and an exothermic heater of tubular form comprising an inner annular layer of chemical material and an outer layer of fibrous material, the chemical material being such as to react exothermically with a liquid, and the fibrous layer acting as a distributor of the liquid to the chemical material, and a porous fabric support for said chemical layer to retain its tubular form, the liquid being introduced to the fibrous layer through said pipe lengthwise thereof, a steam tight closure for the root end of said steaming tube and a removable closure for the other end.

In testimony whereof I affix my signature.

PETER SARTORY.